(12) United States Patent
Saadany et al.

(10) Patent No.: US 8,508,745 B2
(45) Date of Patent: Aug. 13, 2013

(54) SYSTEM, METHOD AND APPARATUS FOR A MICROMACHINED INTERFEROMETER USING OPTICAL SPLITTING

(75) Inventors: Bassam A. Saadany, Nasr (EG); Diaa A. Khalil, Madina Nasr (EG); Tarik E. Bourouina, Le-Pont (FR)

(73) Assignee: Si-Ware Systems, Cairo (EG)

( * ) Notice: Subject to any disclaimer, the term of this patent is extended or adjusted under 35 U.S.C. 154(b) by 368 days.

(21) Appl. No.: 12/849,638

(22) Filed: Aug. 3, 2010

(65) Prior Publication Data

US 2010/0315647 A1 Dec. 16, 2010

Related U.S. Application Data

(63) Continuation-in-part of application No. 11/900,885, filed on Sep. 13, 2007, now Pat. No. 7,796,267.

(60) Provisional application No. 60/848,018, filed on Sep. 28, 2006.

(51) Int. Cl.
*G01B 9/02* (2006.01)

(52) U.S. Cl.
USPC .................................................. 356/450

(58) Field of Classification Search
USPC .................................................. 356/450
See application file for complete search history.

(56) References Cited

U.S. PATENT DOCUMENTS

| | | | | |
|---|---|---|---|---|
| 3,419,331 A | * | 12/1968 | Diehr | 356/498 |
| 3,443,871 A | * | 5/1969 | Chitayat | 356/498 |
| 7,564,559 B2 | * | 7/2009 | Choo et al. | 356/450 |
| 2007/0263204 A1 | * | 11/2007 | Ju | 356/4.09 |

* cited by examiner

*Primary Examiner* — Tarifur Chowdhury
*Assistant Examiner* — Jonathon Cook
(74) *Attorney, Agent, or Firm* — Garlick & Markison; Holly L Rudnick (57) ABSTRACT

A Mach-Zehnder MEMS interferometer is achieved using two half plane beam splitters formed at respective edges of a first medium. The first beam splitter is optically coupled to receive an incident beam and operates to split the incident beam into two beams, a first one propagating in the first medium towards the second beam splitter and a second one propagating in a second medium. A moveable mirror in the second medium reflects the second beam back towards the second beam splitter to cause interference of the two beams.

21 Claims, 8 Drawing Sheets

SYSTEM, METHOD AND APPARATUS FOR A MICROMACHINED INTERFEROMETER USING OPTICAL SPLITTING

CROSS REFERENCE TO RELATED PATENTS

The present U.S. Utility patent application claims priority pursuant to 35 U.S.C. §120, as a continuation-in-part (CIP), to the following U.S. Utility patent application which is hereby incorporated herein by reference in its entirety and made part of the present U.S. Utility patent application for all purposes:

1. U.S. Utility application Ser. No. 11/900,885, entitled "System, Method and Apparatus for a Micromachined Interferometer Using Optical Splitting," filed Sep. 13, 2007, pending, which claims priority pursuant to 35 U.S.C. §119(e) to the following U.S. Provisional Patent Application which is hereby incorporated herein by reference in its entirety and made part of the present U.S. Utility patent application for all purposes:

a. U.S. Provisional Application Ser. No. 60/848,018, filed Sep. 28, 2006.

BACKGROUND OF THE INVENTION

1. Technical Field of the Invention

The present invention relates in general to optical MEMS, and in particular, to micromachined interferometers.

2. Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices enables the integration of equipment incorporating MEMS devices, such as MEMS-based Michelson Interferometers, into mobile and hand held devices.

Moreover, MEMS technology, with its numerous actuation techniques, enables the realization of new functions and features of photonic devices, such as optical tunability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

MEMS-based Michelson Interferometers have been realized using Silicon On Insulator (SOI) technology, where beam splitting is performed using a thin wall of silicon (Si) or glass. However, the performance of current MEMS-based Michelson Interferometers is highly dependent on the thickness of the silicon or glass wall. In practice, the industrialization of such a device has been problematic, since repeatability of performance is highly sensitive to the fabrication process parameters. Another problem with using conventional thin silicon wall beam splitters is the spectral sensitivity of the "beam splitting ratio", since the two Si/Air interfaces of the beam splitter contribute a parasitic Fabry-Pérot effect, thus modulating the power splitting ratio versus wavelength. This parasitic effect naturally degrades the performance of the Michelson Interferometer due to the noise introduced by operating in different wavelengths. Another problem in conventional beam splitters is the interference of the two separated beams from the two surfaces of the splitter. A silicon beam splitter was proposed in U.S. Pat. No. 4,632,553 to Vidring, et al., where the splitter was configured in a wedge shape. This wedge shape employed two splitting surfaces with different angles to avoid interference of the separated beams. However, although the wedge-shaped beam splitter solves the beam separation problem, it still suffers from the same problems of fabrication tolerance and parasitic dependence of "beam splitting ratio" on wavelength.

Therefore, there is a need for a more robust and more accurate micromachined interferometer. In particular, there is a need for a micromachined interferometer that exhibits a higher tolerance to the fabrication process, as well as a more stable spectral response of the beam splitting ratio.

SUMMARY OF THE INVENTION

Embodiments of the present invention provide a Mach-Zehnder Micro Electro-Mechanical System (MEMS) interferometer. The Mach-Zehnder interferometer includes a first medium and a second medium different from and adjacent to the first medium. The first medium has a first edge forming a first half plane beam splitter and a second edge opposite to the first edge forming a second half plane beam splitter. The first half plane beam splitter is optically coupled to receive an incident beam and to split the incident beam into first and second beams. The first beam propagates in the first medium towards the second half plane beam splitter, while the second beam propagates in the second medium.

The interferometer further includes a moveable mirror within the second medium and an actuator coupled to the moveable mirror. The moveable mirror is optically coupled to receive the second beam and to reflect the second beam back towards the second half plane beam splitter as a reflected beam to cause interference between the first beam and the reflected beam at the second half plane beam splitter. In an exemplary embodiment, the actuator causes a displacement of the moveable mirror that produces an optical path length difference between the two split incident beams equal to twice the moveable mirror displacement.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

In accordance with embodiments of the present invention, a silicon-air interface (a half plane) is used to perform beam splitting in a micromachined interferometer for use in applications such as spectrometry, profilometry, vibrometery, environmental sensing, telecom, etc. In embodiments of the present invention, the interferometer may be, for example, a Michelson interferometer, a Mach-Zehnder interferometer or a Twyman-Green interferometer. However, for simplicity, the present invention will be described with reference to a Michelson interferometer and a Mach-Zehnder interferometer. The interferometer is realized over an SOI wafer to allow for a MEMS-actuated moving minor. Due to the fact that the Silicon/Air interface spectral response is flat over the silicon spectral window, the interferometer splitting ratio has no wavelength dependence as in conventional silicon wall beam splitters.

Figure 1A:
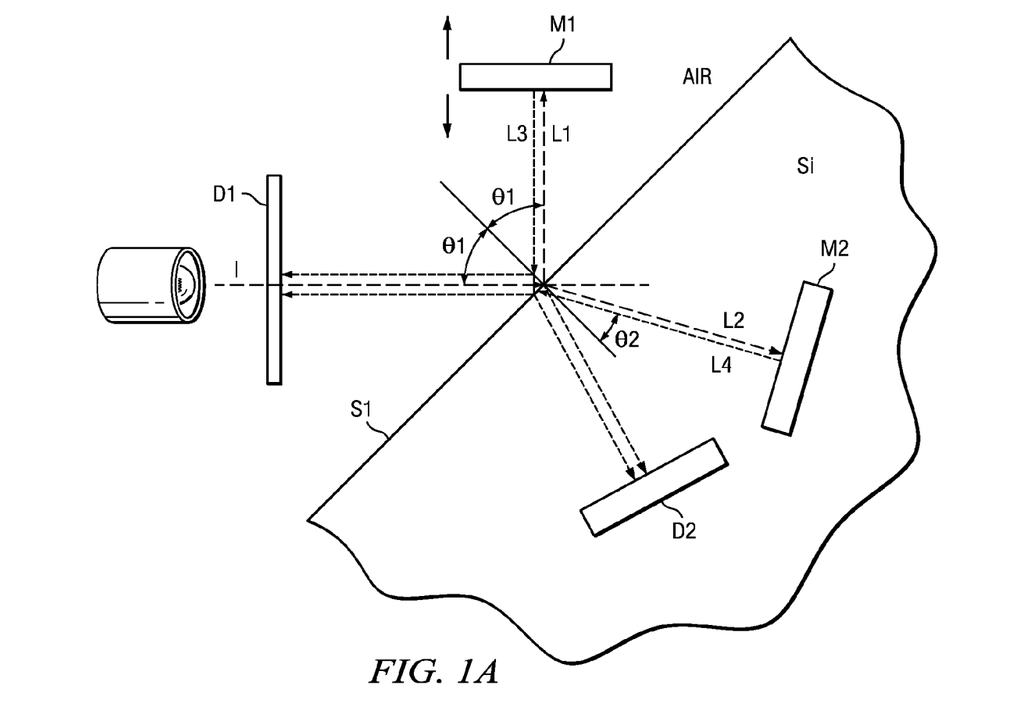
FIG. 1A is a pictorial diagram illustrating an exemplary Michelson micromachined interferometer in accordance with embodiments of the present invention.

Referring now to FIG. 1A, there is illustrated an exemplary Michelson micromachined (MEMS-based) interferometer. In FIG. 1A, the Silicon/Air interface beam splitter S1 is positioned at an angle θ1 (for example, 45 degrees) from the incident beam I. The incident beam is thus split in two beams L1 and L2, where L1 propagates in air and L2 propagates in silicon. L1 originates from the partial reflection of the incident beam I from the silicon/Air half plane beam splitter S1, and thus has a reflection angle equal to the beam incidence angle θ1. L1 propagates in air until reflected from mirror M1, thus producing reflected beam L3.

L2 originates from the partial transmission of the incident beam I through silicon/Air half plane beam splitter S1 and propagates in silicon at an angle θ2 (determined by Snell's law). L2 continues to propagate in silicon until reflected by minor M2, thus producing reflected beam L4. Mirror M2 is fixed and embedded in the silicon medium at a perpendicular angle to the beam L2. As shown in FIG. 1, both beams L3 and L4 take the same optical path (in the opposite direction) after reflection from mirrors M1 and M2 respectively, thus producing an interference pattern (illustrated by dotted lines) that can be detected on either of the detection planes D1 or D2, which can be, for example, photodetectors. In an exemplary embodiment, mirror M1 is movable using SOI electrostatic comb drive actuation, thus allowing for an optical path length difference equal to double the minor displacement.

Figure 1B:
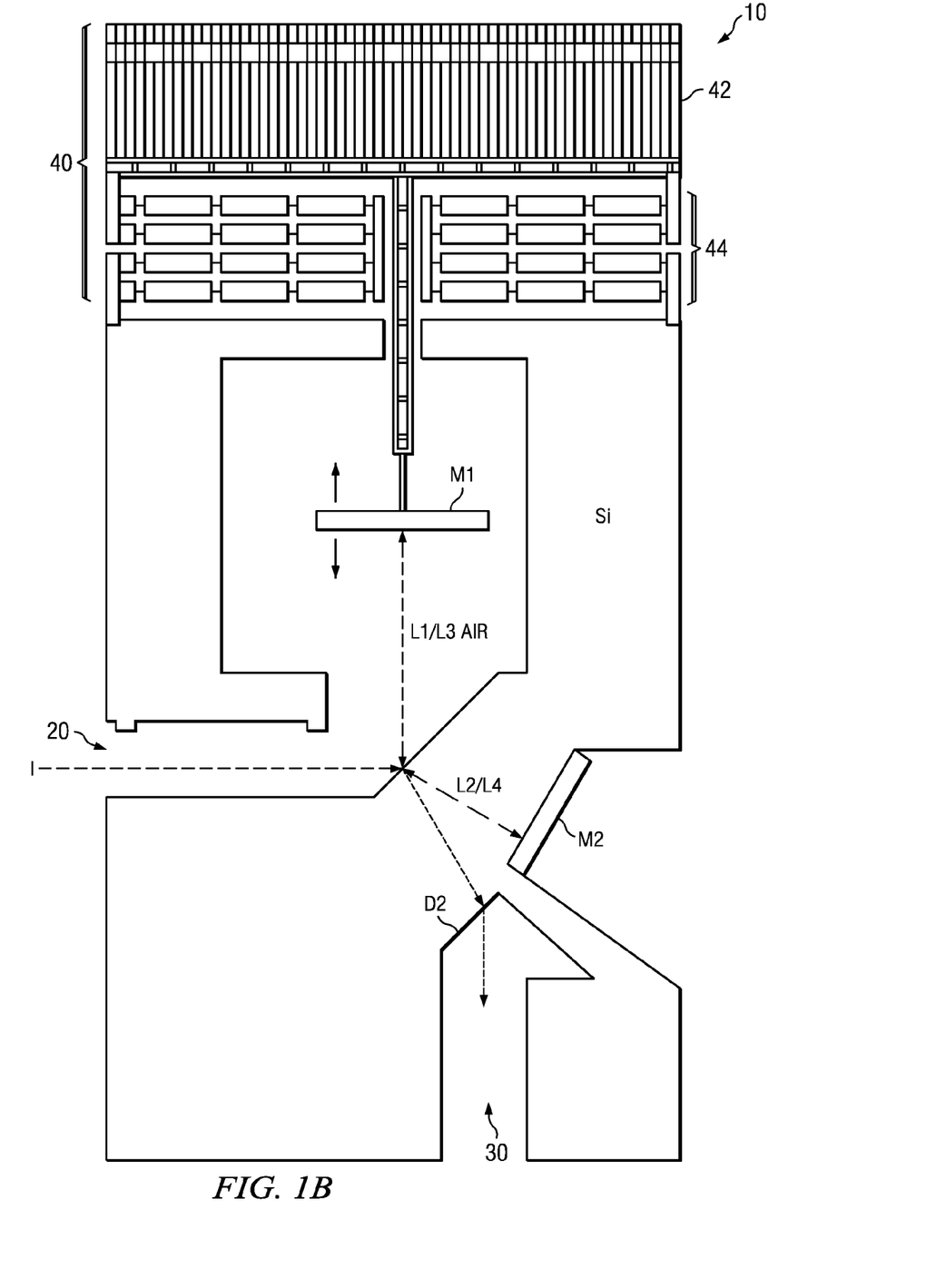
FIG. 1B is a layout diagram of an exemplary Michelson micromachined interferometer in accordance with embodiments of the present invention.

FIG. 1B is a layout diagram of a Michelson micromachined interferometer 10, in accordance with embodiments of the present invention. The micromachined interferometer 10 includes the silicon/air half plane beam splitter S1, input and output fiber grooves 20 and 30, moving minor M1, fixed minor M2 and an electrostatic actuator 40. In an exemplary embodiment, as shown in FIG. 1B, the electrostatic actuator 40 is formed of a comb drive 42 and spring 44.

In an exemplary operation, the incident beam I enters the device 10 through the input fiber groove 20. Upon impinging the half plane beam splitter S1, the incident beam I is split into two beams L1 and L2. L1 propagates in air towards mirror M1, while L2 propagates in silicon towards mirror M2. Mirror M2 is fixed and embedded in the silicon medium at a perpendicular angle to the beam L2. However, as described above, minor M1 is moveable using the MEMS electrostatic actuator 40, allowing for an optical path length difference between beams L1 and L2 equal to double the minor displacement. For example, by applying a voltage to the comb drive 42, a potential difference results across the actuator 40, which induces a capacitance therein, causing a driving force to be generated as well as a restoring force from the spring 42, thereby causing a displacement of minor M1 to the desired position for reflection of the beam L1.

As shown in FIG. 1B, beams L1 and L2 take the same optical path (in the opposite direction) after reflection from mirrors M1 and M2 respectively, thus producing an interference pattern (illustrated by dotted lines) that can be detected on detection plane D2, or output via output fiber groove 30. As described above, detection plane D2 can be, for example, a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

In one embodiment, mirrors M1 and M2 are metallic mirrors, where selective metallization (e.g. using a shadow mask during metallization step) is used to protect the beam splitter. In another embodiment, vertical Bragg mirrors are used to obtain a small foot print interferometer. The Bragg mirrors can be realized using Deep Reactive Ion Itching (DRIE), thus producing successive vertical Silicon/Air interfaces. In addition, the Bragg mirrors can be designed either to have a wide spectrum reflection response to act as simple reflectors or with a wavelength selective response, depending on the application.

Although a silicon/air interface is described herein for the beam-splitter, other mediums providing a half wave plane can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Figure 2A:
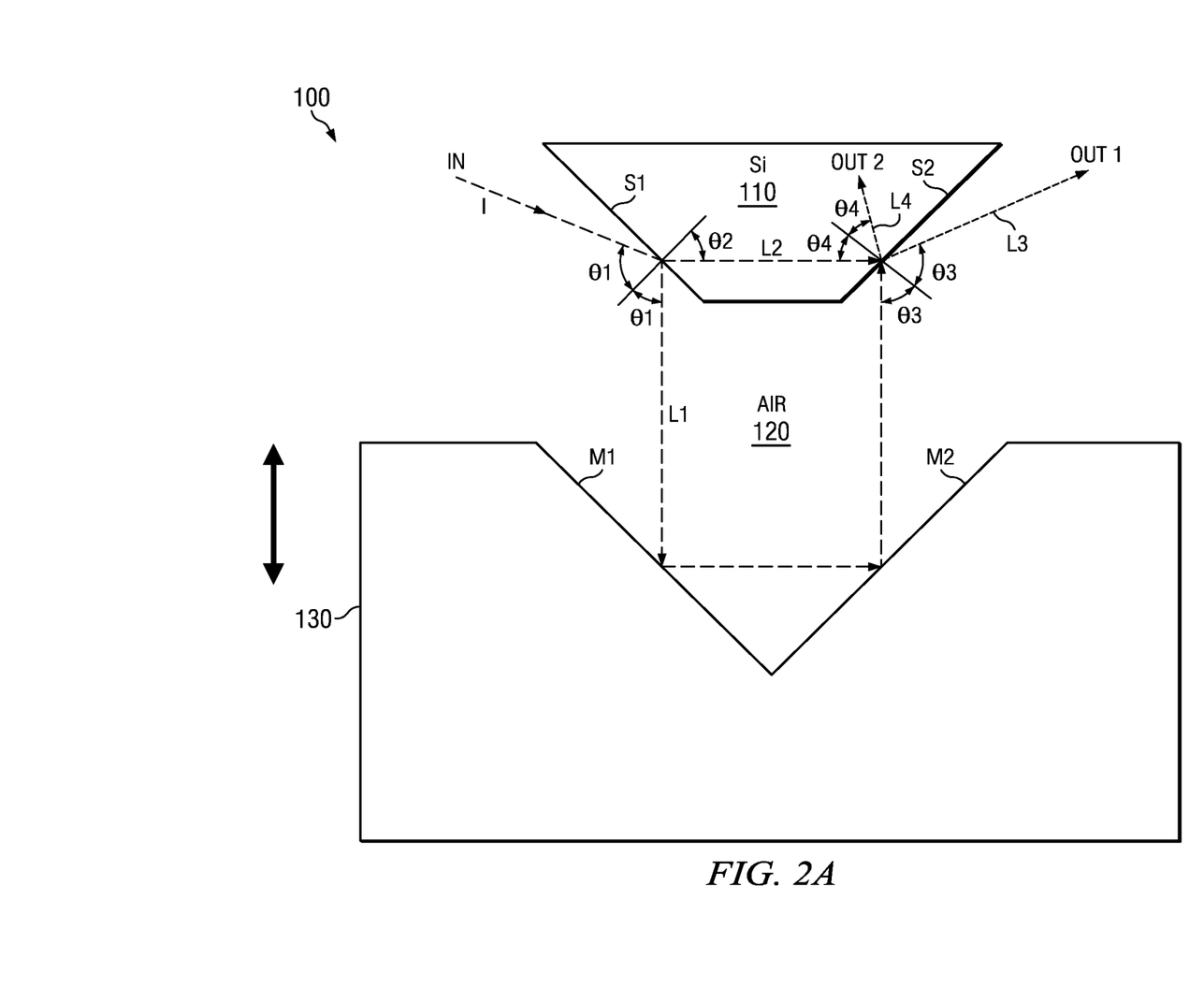
FIG. 2A is a pictorial diagram illustrating an exemplary Mach-Zehnder miromachined interferometer in accordance with embodiments of the present invention.

FIG. 2A illustrates an exemplary Mach-Zehnder micromachined interferometer 100 in accordance with embodiments of the present invention. As in the Michelson interferometer shown in FIG. 1A, the optical radiation in the Mach-Zehnder interferometer 100 shown in FIG. 2A is propagating in silicon 110 in one arm and in air 120 in the second arm. However, in the Mach-Zehnder interferometer 100 shown in FIG. 2A, the two mirrors M1 and M2 are connected together and actuated as a moveable minor 130 to direct one of the incident beams towards an additional silicon/air interface beam splitter S2 that produces the requisite interfering beams. However, in other embodiments, the two mirrors M1 and M2 may not be connected and may each be individually moveable using different actuators. The angle between the two mirrors M1 and M2 depends on the geometry and the refractive index of the medium containing the mirrors M1 and M2.

In particular, as shown in FIG. 2A, the first silicon/air interface half plane beam splitter S1 is formed at a first edge of the silicon substrate 110 and positioned at an angle θ1 (for example, 45 degrees) from the incident beam I. The incident beam is split in two incident beams L1 and L2, where L1 propagates in air 120 and L2 propagates in silicon 110. As in FIG. 1A, L1 originates from the partial reflection of the incident beam I from the first silicon/air half plane beam splitter S1, and thus has a reflection angle equal to the beam incidence angle θ1. L1 propagates in air until it reaches the moveable mirror 130. The moveable mirror 130 receives L1 on the first mirror M1 and reflects L1 toward the second mirror M2, which again reflects L1 back towards the silicon substrate 110.

L2 originates from the partial transmission of the incident beam I through the first silicon/air half plane beam splitter S1 and propagates in silicon 110 at an angle θ2 (determined by Snell's law). L2 continues to propagate in silicon until it reaches the second silicon/air half plane beam splitter S2 formed at a second edge of the silicon substrate 110 opposite the first edge thereof. Since mirror M2 also directs reflected incident beam L1 towards the second silicon/air half plane beam splitter S2, beams L1 and L2 interfere at the second silicon/air half plane beam splitter S2, thus producing interfering beams L3 and L4 (as the outputs of the interferometer) that can be detected on detection planes (not shown). Since the two beams L1 and L2 are propagating in two different mediums with two different speeds and propagation constants, a zero optical path length difference (OPLD) between L1 and L2 can easily be achieved for a specific geometry of the mirrors M1 and M2. In embodiments in which a particular OPLD is desired, choosing a particular angle between the two mirrors M1 and M2 and/or causing a particular displacement of one or both mirrors M1 and M2 can produce the desired OPLD.

As shown in FIG. 2A, interfering beam L3 propagates in air 120 toward a detector (not shown), while interfering beam L4 propagates in silicon 110 towards another detector (not shown). L3 originates from the interference between a partial reflection of beam L1 and a partial transmission of beam L2 from the second silicon/air half plane beam splitter S2, and thus has a reflection/transmission angle equal to the beam incidence angle θ3. L4 originates from the interference between a partial transmission of beam L1 and a partial reflection of beam L2 from the second silicon/air half plane beam splitter S2 and propagates in silicon 110 at an angle θ4.

Figure 2B:
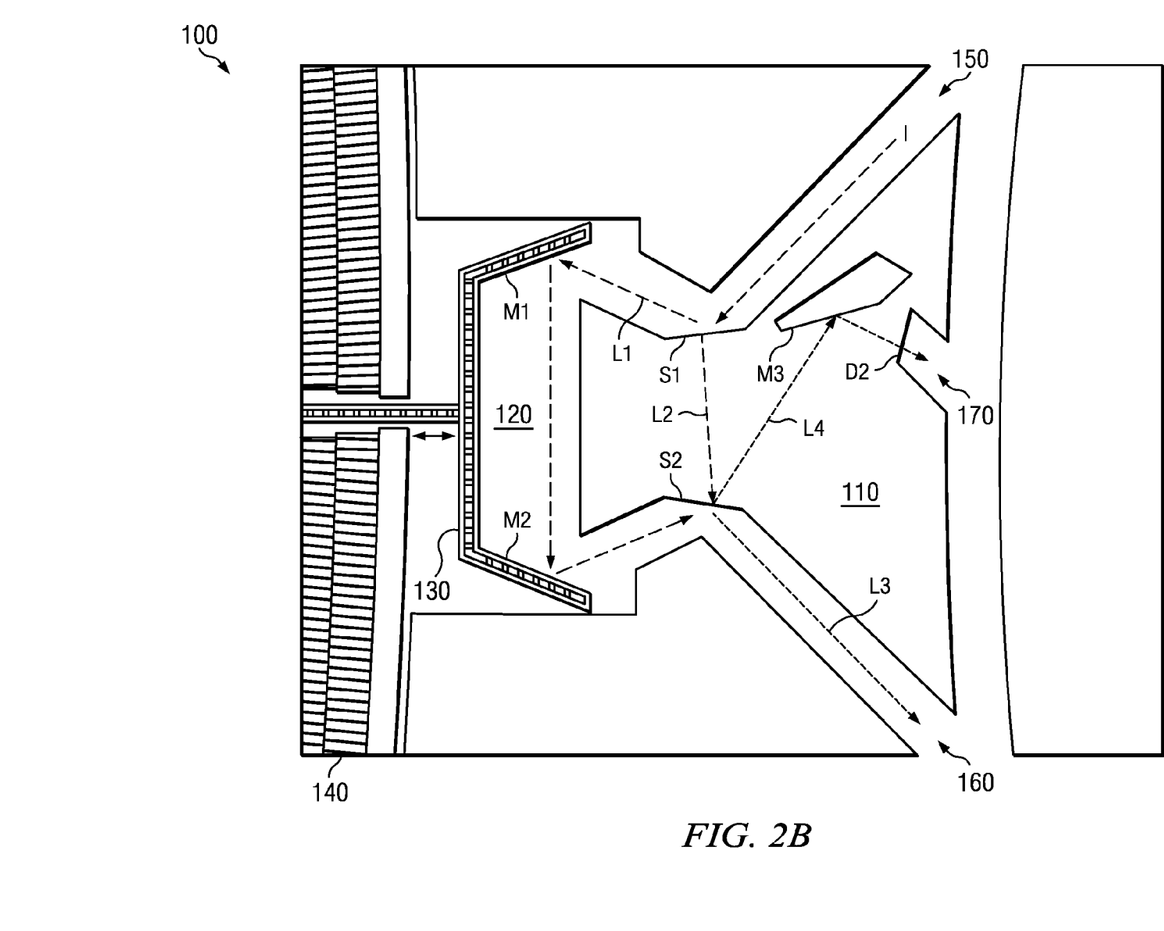
FIG. 2B is a layout diagram of an exemplary Mach-Zehnder micromachined interferometer in accordance with embodiments of the present invention.

FIG. 2B is a layout diagram of a Mach-Zehnder micromachined interferometer 100, in accordance with embodiments of the present invention. The micromachined interferometer 100 includes the two silicon/air half plane beam splitters S1 and S2 formed between the silicon substrate 110 and air 120, an input fiber groove 150, output fiber grooves 160 and 170, moveable mirror 130 containing moving mirrors M1 and M2 and an electrostatic actuator 140. In an exemplary embodiment, as shown in FIG. 2B, the electrostatic actuator 140 is a comb drive actuator. The actuator 140 can be a single actuator, as shown in FIG. 2B, or two separate actuators, one for each of the moving mirrors M1 and M2. The interferometer also includes mirror M3 embedded in silicon to direct the interfering beam L4 to the output fiber groove 170.

In an exemplary operation, the incident beam I enters the device 100 through the input fiber groove 150. Upon impinging the first half plane beam splitter S1, the incident beam I is split into two beams L1 and L2. L1 propagates in air 120 towards mirror M1, while L2 propagates in silicon 110 towards the second half plane beam splitter S2. Since the moveable mirror 130 is moveable using the MEMS electrostatic actuator 140, an optical path length difference is produced between beams L1 and L2 equal to double the mirror displacement. As shown in FIG. 2B, beams L1 and L2 interfere at the second half plane beam splitter S2, thus producing an interference pattern that can be detected at optional detection plane D2 or output via output fiber grooves 160 and 170 to other detectors.

In one embodiment, mirrors M1-M3 are metallic mirrors, where selective metallization (e.g. using a shadow mask during metallization step) is used to protect the beam splitter. In another embodiment, vertical Bragg mirrors are used to obtain a small foot print interferometer. The Bragg mirrors can be realized using Deep Reactive Ion Itching (DRIE), thus producing successive vertical Silicon/Air interfaces. In addition, the Bragg mirrors can be designed either to have a wide spectrum reflection response to act as simple reflectors or with a wavelength selective response, depending on the application.

Although a silicon/air interface is described herein for the beam-splitter, other mediums providing a half wave plane can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interfaces.

Figure 3A:
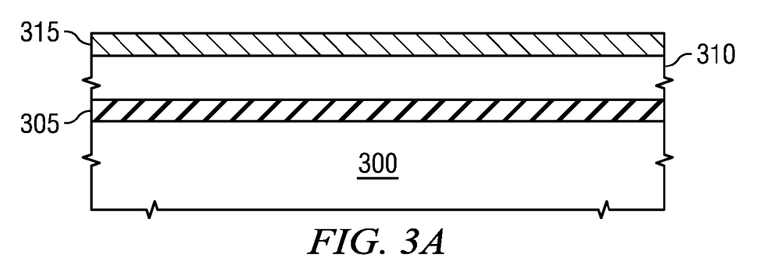
FIGS. 3A-3J illustrate exemplary fabrication process steps for fabricating a micromachined interferometer in accordance with embodiments of the present invention.
Figure 3B:
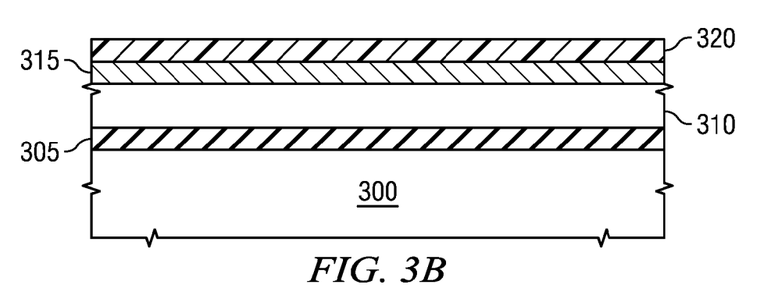
Figure 3C:
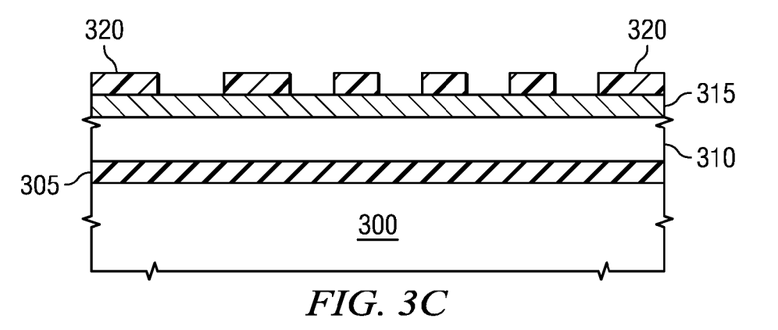
Figure 3D:
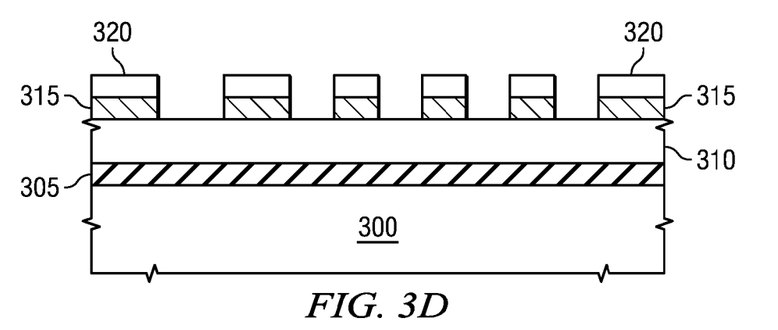
Figure 3E:
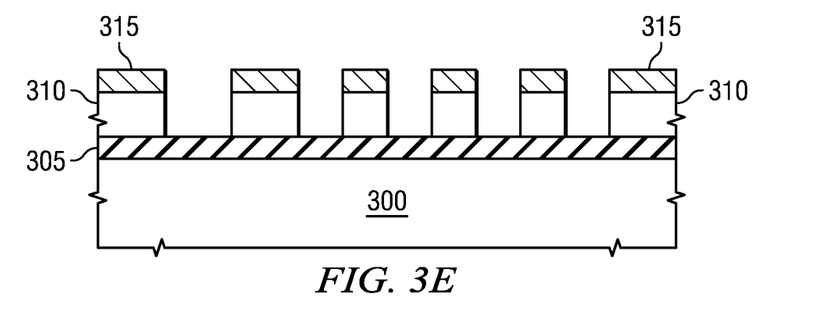
Figure 3F:
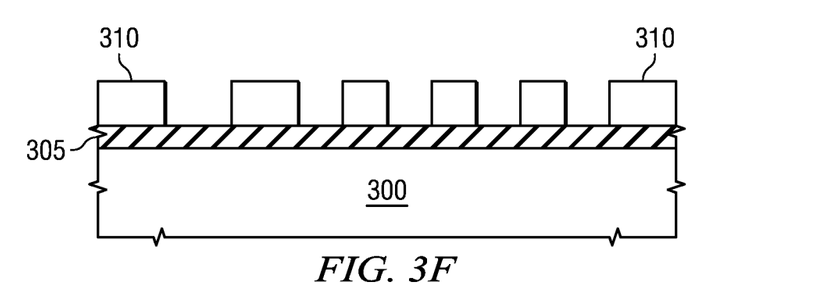

An exemplary fabrication process of a micromachined interferometer is shown in FIGS. 3A-3J. In FIG. 3A, an aluminum sputtering step is performed over an SOI wafer (layers 300-310) to form an aluminum layer 315, which functions as a mask for a subsequent etching of the top silicon layer 310 of the SOI wafer using DRIE, as shown in FIG. 3E. In FIG. 3B, a photo-resist material 320 is spun over the aluminum layer. In FIG. 3C, a lithography step is performed for realizing the mirrors, half plane beam splitter(s), fiber grooves, detector(s) and the electrostatic actuator. The lithography pattern in the photo-resist material 320 is transferred to the aluminum mask 315 by plasma chlorine etching of the aluminum layer, as shown in FIG. 3D. DRIE is then applied to the wafer until reaching the oxide etch stop layer 305 of the SOI, as shown in FIG. 3E. Finally, in FIG. 3F, the remaining aluminum mask 315 is removed using an Alu etch.

Figure 3G:
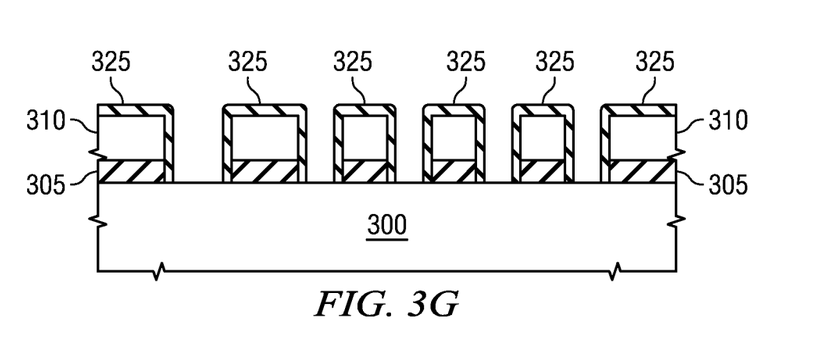
Figure 3H:
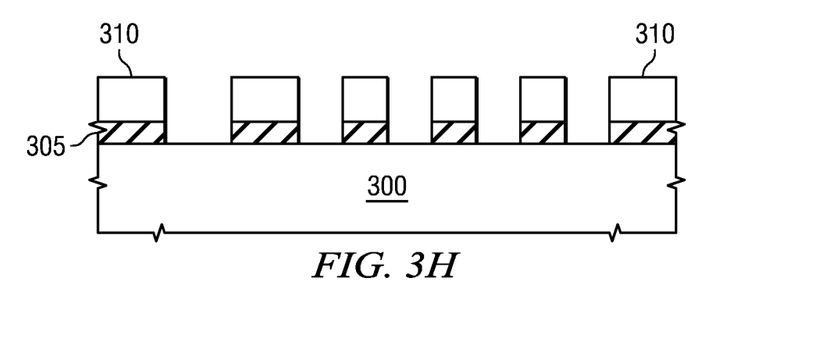
Figure 3I:
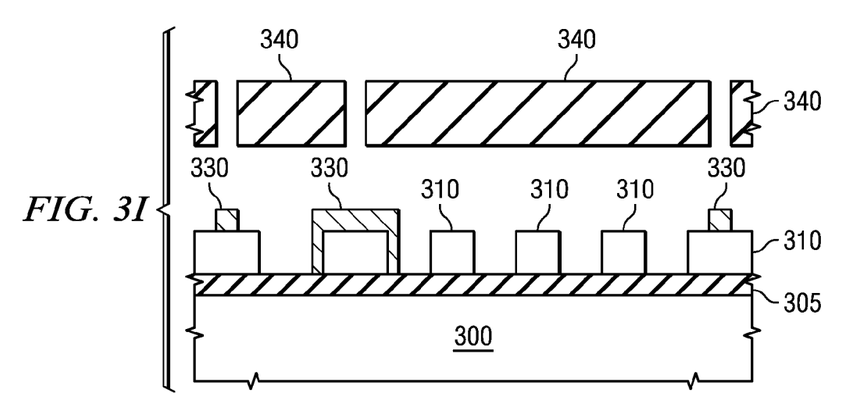
Figure 3J:
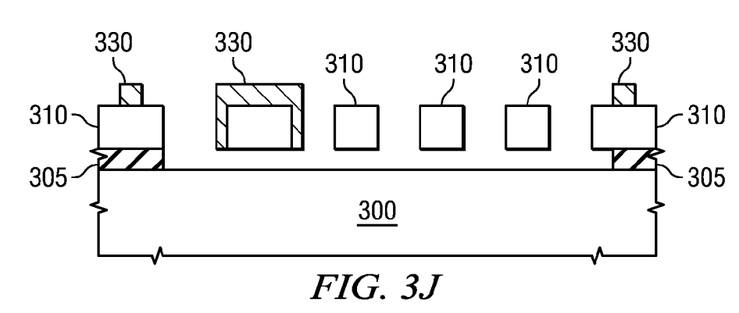

Turning now to FIG. 3I, a shadow mask 340 is used for the selective metallization 330 of the mirrors, as well as for creating connection pads. As shown in FIG. 3I, the shadow mask 340 is placed over the SOI substrate 300-310 to selectively sputter Cr/Au 330 onto desired portions of the top silicon layer 310. In embodiments in which non-metallic mirrors, such as Bragg mirrors, are used, the shadow mask step is not performed, and the pad metallization may be carried out at the beginning provided that metallization thickness is strong enough to survive the rest of the process steps. As shown in FIG. 3J, moving structures such as comb fingers, spring and moving mirror are released by etching the buried $SiO_2$ layer 305 using HF, while fixed structures are not released due to the wider area of the $SiO_2$ beneath.

In embodiments in which the Bosch process is used for DRIE etching (shown in FIG. 3E), rough mirror surfaces may result due to the periodic nature of the process. Thus, as shown in FIG. 3G, growing a thin oxide layer 325 on the surfaces and then removing it by HF, as shown in FIG. 3H, can be useful before structure release to ensure a smoother mirror surface. However, if a cryogenic DRIE process is used in FIG. 3E, the process steps shown in FIGS. 3G and 3H would be unnecessary since a smoother surface is obtained directly after etching. In addition, the aluminum mask shown in FIG. 3A is not necessary, as the process tends to have better selectivity between a photo-resist material and silicon at cryogenic temperatures.

Figure 4A:
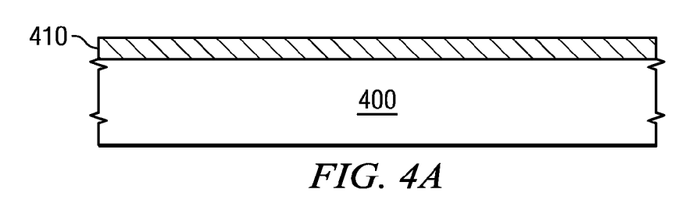
FIGS. 4A-4F illustrate exemplary fabrication process steps for fabricating a shadow mask in accordance with embodiments of the present invention.
Figure 4B:
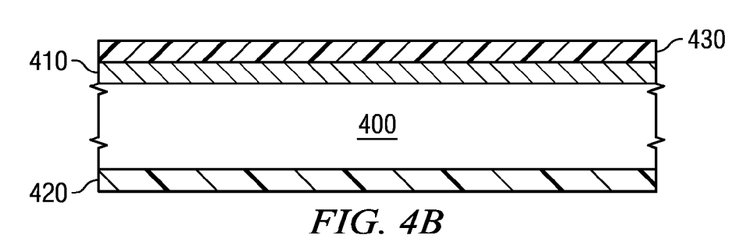

An exemplary process for creating the shadow mask is shown in FIGS. 4A-4F. As described above in connection with FIG. 3I, the shadow mask is used for the selective metallization of the wafer to ensure an adequate metallization for the mirrors, while at the same time protecting the half plane beam splitter. As shown in FIG. 4A, to create the shadow mask, first a metallic layer 410 is formed over a silicon wafer 400 using, for example, aluminum sputtering. Then, in FIG. 4B, a photo-resist material 420 and 430 is spun on both sides of the wafer 400. The top photo-resist material 430 is used for lithography, and the bottom photo-resist material 420 functions as an etch stop.

Figure 4C:
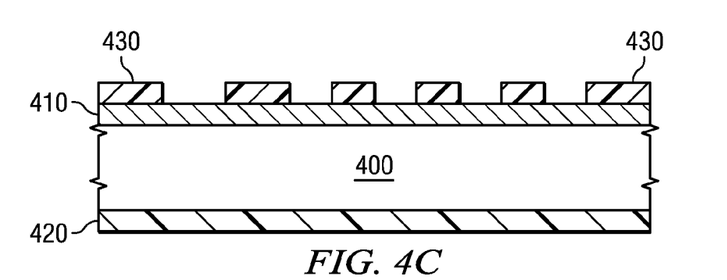
Figure 4D:
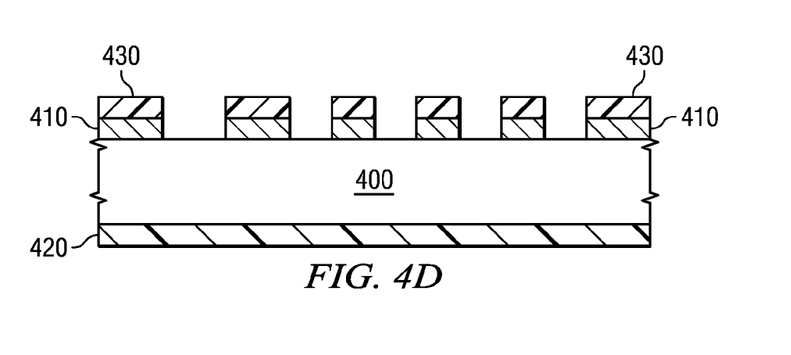
Figure 4E:
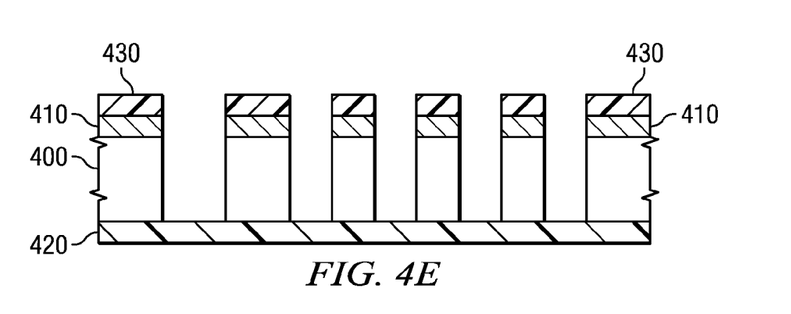
Figure 4F:
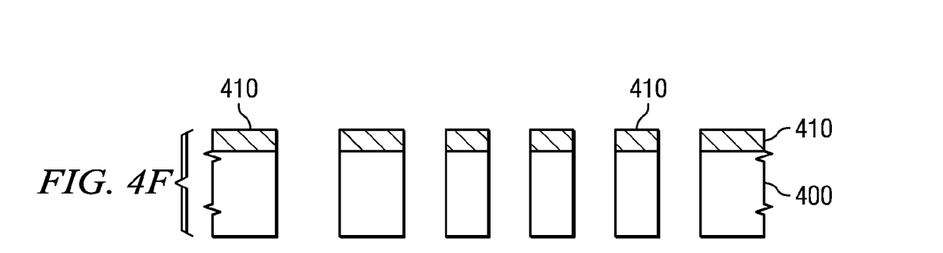

Subsequently, as shown in FIG. 4C, lithography is carried out on the top layer 430, followed by chlorine plasma etching of the aluminum layer 410, as shown in FIG. 4D. In FIG. 4E, using DRIE, etching through the silicon wafer 400 is performed until reaching the photo-resist material 420 on the bottom of the wafer 400. Finally, as shown in FIG. 4F, the photo-resist material 420 and 430 on the top and bottom of the wafer are removed to complete the shadow mask.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A Mach-Zehnder Micro Electro-Mechanical System (MEMS) interferometer, comprising:
    a first medium having a first edge forming a first half plane beam splitter and a second edge opposite to said first edge forming a second half plane beam splitter, said first half plane beam splitter optically coupled to receive an incident beam and to split said incident beam into first and second beams, said first beam propagating in said first medium towards said second half plane beam splitter;
    a second medium different from and adjacent to said first medium, said second beam propagating in said second medium;
    first and second moveable mirrors within said second medium, said first moveable minor optically coupled to receive said second beam and to reflect said second beam towards said second moveable mirror, said second moveable minor reflecting said second beam back towards said second half plane beam splitter as a reflected beam to cause interference between said first beam and said reflected beam at said second half plane beam splitter; and
    an actuator coupled to said first and second moveable mirrors to cause a displacement thereof, said displacement producing an optical path length difference between said first and second beams that is a function of said displacement.

2. The interferometer of claim 1, wherein said first medium silicon and said second medium is air.

3. The interferometer of claim 1, wherein said first medium is silicon, glass, Pyrex or quartz and said second medium is a gas or liquid.

4. The interferometer of claim 1, further comprising:
    a detection plane optically coupled to detect an interference pattern produced as a result of interference between said first beam and said reflected beam at said second half plane beam splitter.

5. The interferometer of claim 4, wherein said detection plane includes a photodetector.

6. The interferometer of claim 4, wherein said second half plane beam splitter is operable to produce a first interfering beam containing said interference pattern and said detection plane includes a first detector optically coupled to receive said first interfering beam, said first interfering beam propagating in said first medium towards said first detector.

7. The interferometer of claim 6, wherein said first detector is within said first medium.

8. The interferometer of claim 6, wherein said second half plane beam splitter is further operable to produce a second interfering beam containing said interference pattern and propagating in said second medium.

9. The interferometer of claim 8, wherein said first interfering beam is produced from an interference between a partial transmission of said reflected beam and a partial reflection of said first beam from said second half plane beam splitter and said second interfering beam is produced from an interference between a partial reflection of said reflected beam and a partial transmission of said first beam from said second half plane beam splitter.

10. The interferometer of claim 8, further comprising:
    an input fiber groove optically coupled to provide said incident beam to said first half plane beam splitter; and
    an output fiber groove optically coupled to receive said second interfering beam from said second half plane beam splitter.

11. The interferometer of claim 10, wherein said detection plane further includes a second detector optically coupled to said output fiber groove to receive said second interfering beam, said second interfering beam propagating in said second medium along said output fiber groove towards said second detector.

12. The interferometer of claim 10, further comprising:
    a second output fiber groove coupling said first medium to said first detector, said first interfering beam exiting said first medium and propagating in said second medium towards said first detector.

13. The interferometer of claim 1, wherein said first beam is produced from a partial transmission of said incident beam through said first half plane beam splitter and said second beam is produced from a partial reflection of said incident beam from said first half plane beam splitter; and wherein a reflection angle of said second beam is equal to an incidence angle of said incident beam.

14. The interferometer of claim 1, wherein said actuator is an electrostatic comb drive actuator.

15. The interferometer of claim 1, wherein said first and second moveable mirrors are coupled together.

16. The interferometer of claim 1, wherein said actuator includes a first actuator and a second actuator, each coupled to a respective one of said first and second moveable mirrors to cause a respective displacement thereof.

17. The interferometer of claim 1, wherein said first and second moveable mirrors are metallic mirrors.

18. The interferometer of claim 1, wherein said first and second moveable mirrors are non-metallic vertical Bragg mirrors.

19. The interferometer of claim 1, further comprising:
    a silicon on insulator (SOI) wafer including a top layer and a bottom layer;
    wherein said first and second half plane beam splitters, said first and second moveable mirrors and said actuator are photolithographic ally defined within said top surface of said SOI wafer;

wherein said first and second moveable mirrors and said actuator are released by sacrificial etching between said top layer of said SOI wafer and said bottom layer of said SOI wafer.

20. The interferometer of claim 19, wherein:

said first medium is silicon and said second medium is air; and said first and second half plane beam splitters are formed by etching away respective parts of said top surface of said SOI wafer to create respective interfaces between silicon and air.

21. The interferometer of claim 1, wherein each of said first and second half plane beam splitters comprises a single reflecting and refracting surface forming an interface between said first medium and said second medium.

* * * * *